United States Patent
Wiginton et al.

(10) Patent No.: US 11,150,884 B1
(45) Date of Patent: Oct. 19, 2021

(54) DEVICE DRIVER UPDATE IMAGES

(71) Applicant: HEWLETT PACKARD ENTERPRISE DEVELOPMENT LP, Houston, TX (US)

(72) Inventors: Scotty M. Wiginton, Tomball, TX (US); Jason Spottswood, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 24 days.

(21) Appl. No.: 16/835,968

(22) Filed: Mar. 31, 2020

(51) Int. Cl.
| | |
|---|---|
| G06F 8/61 | (2018.01) |
| G06F 8/65 | (2018.01) |
| G06F 9/451 | (2018.01) |
| G06F 9/4401 | (2018.01) |
| G06F 9/445 | (2018.01) |

(52) U.S. Cl.
CPC .............. *G06F 8/63* (2013.01); *G06F 8/65* (2013.01); *G06F 9/4411* (2013.01); *G06F 9/44505* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 8,560,822 B1 * | 10/2013 | Chan | ................... | H04N 21/443 |
| | | | | 713/1 |
| 9,110,679 B1 * | 8/2015 | Chan | ................... | G06F 9/4411 |
| 9,507,581 B2 | 11/2016 | Butcher et al. | | |
| 10,140,117 B2 | 11/2018 | Annapureddy et al. | | |
| 10,402,281 B2 | 9/2019 | Narasimhan et al. | | |
| 2004/0230963 A1 * | 11/2004 | Rothman | ................... | G06F 8/65 |
| | | | | 717/168 |
| 2013/0139183 A1 * | 5/2013 | Mallur | ................... | G06F 8/63 |
| | | | | 719/321 |
| 2019/0391799 A1 | 12/2019 | Samuel et al. | | |

OTHER PUBLICATIONS

David Edfeldt, "Leveraging Windows Update to Distribute Firmware Updates," May 2014, pp. 1-17, Microsoft.

Kinney, Michael, Intel, System Firmware and Device Firmware Updates using Unified Extensible Firmware Interface (UEFI) Capsules, Oct. 15-19, 2018 (19 pages).

Microsoft, "Windows UEFI firmware update platform." Apr. 20, 2017, pp. 1-4, Retrieved from the Internet on Feb. 26, 2020 at URL: <docs.microsoft.com/en-us/windows-hardware/drivers/bringup/windows-uefi-firmware-update-platform>.

UEFI Forum, Inc., UEFI Specification, Version 2.8, Firmware Update and Reporting, Mar. 2019 (8 pages).

* cited by examiner

*Primary Examiner* — Marina Lee
(74) *Attorney, Agent, or Firm* — Trop, Pruner & Hu, P.C.

(57) ABSTRACT

In some examples, a system receives an update image including a first device driver to execute in a pre-operating system (pre-OS) environment of the system, and detects a second device driver that is already in the system. The system accesses a pre-stored dynamically configurable policy in the system, the pre-stored dynamically configurable policy relating to selection from among device drivers in the pre-OS environment, and determines, based on the pre-stored dynamically configurable policy, an action to take in response to the update image.

20 Claims, 4 Drawing Sheets

DEVICE DRIVER UPDATE IMAGES

BACKGROUND

A system can include various programs (including machine-readable instructions) that execute to perform various tasks. The programs can include firmware, an operating system (OS), and an application program, as examples. The firmware (including boot code) can be executed prior to loading of the OS in the system, such that the firmware executes in a pre-OS environment, which refers to an execution environment of the system in which the OS is not yet executing. The boot code of the firmware can initialize hardware components of the system, and can perform other boot services. After completing its boot services, the boot code can load the OS, after which other programs, such as application programs, can be executed in the system.

BRIEF DESCRIPTION OF THE DRAWINGS

Some implementations of the present disclosure are described with respect to the following figures.

Figure 1:
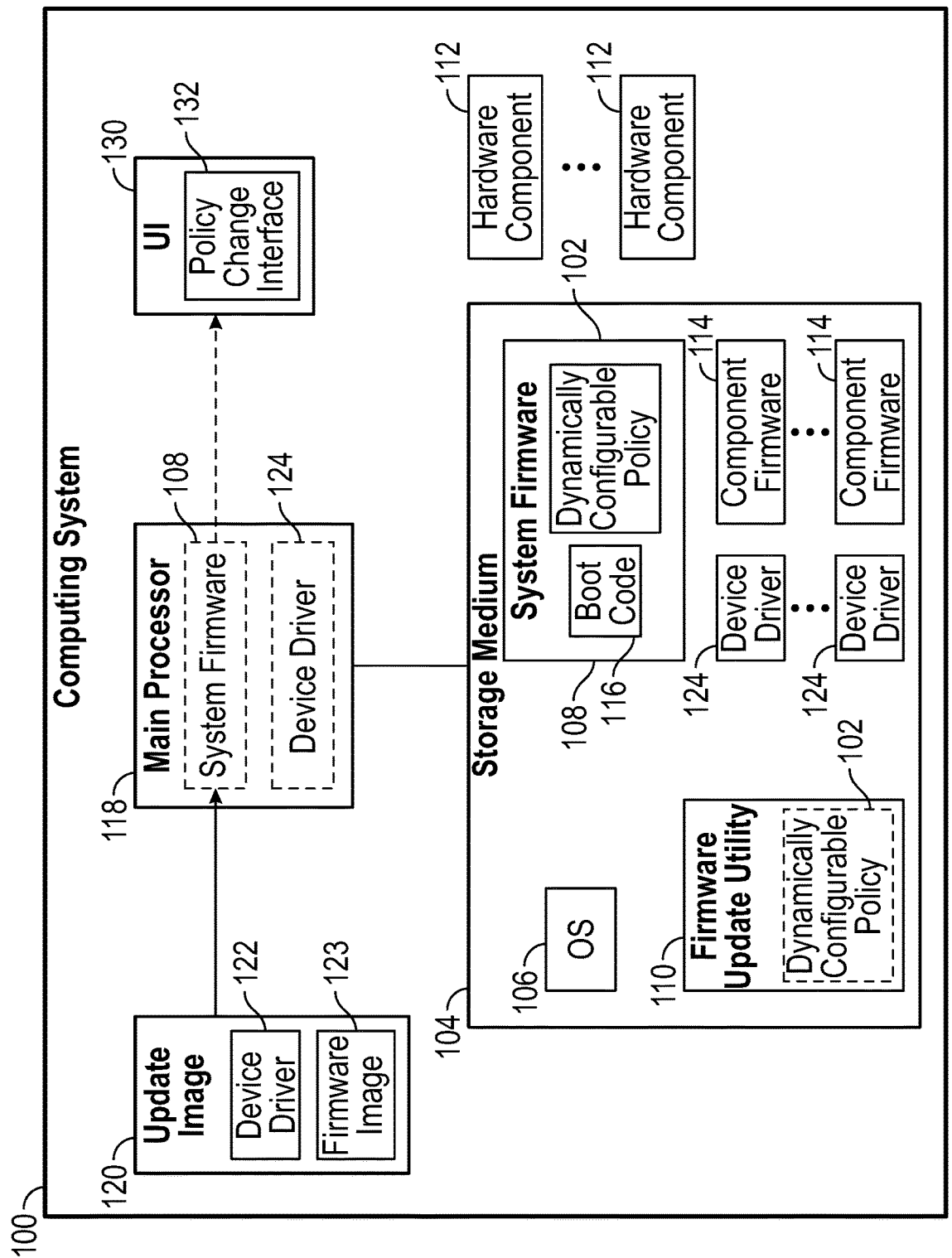
FIG. 1 is a block diagram of a computing system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, system firmware (made up of machine-readable instructions) in a computing system can include Unified Extensible Firmware Interface (UEFI) firmware, as defined by UEFI Specification. The UEFI firmware can perform boot services, including initializing hardware components and other boot services. The UEFI firmware executes in a pre-OS environment of the computing system. In the pre-OS environment, the OS of the computing system is not yet loaded and thus not executing. In other words, in the pre-OS environment, the OS 106 the computing system 100 is inactive.

After completing its boot services and other tasks of the UEFI firmware, the UEFI firmware loads the OS to allow the OS to execute in the computing system. Once the OS is loaded and executes in the computing system, the OS establishes an OS environment in which various machine-readable instructions, such as application programs, are able to execute.

According to UEFI, update images in the form of "capsules" can be provided to update firmware of target hardware components in a computing system. A "hardware component" can refer to any electronic device (or portion an electronic device) within the computing system. Examples of electronic devices include any of the following: a network interface controller, a graphics controller, a memory controller, a storage controller, a management controller, a processor, and so forth. A firmware of a hardware component refers to firmware that is to execute on the hardware component to perform certain specified tasks of the hardware component. In the ensuing discussion, firmware to execute on a hardware component is referred to as "component firmware."

A UEFI capsule (or more simply, a "capsule") includes a payload that contains a firmware image used for updating the firmware of a target hardware component. More generally, the capsule can include multiple payloads that contain respective firmware images for updating the firmware of a target hardware component or multiple target hardware components.

In some cases, a capsule may also include a UEFI device driver that manages an update service relating to a component firmware. The UEFI device driver is used to manage how a firmware image in the capsule is used to update the firmware of a target hardware component. If a UEFI device driver is present in a capsule, a system firmware in a computing system extracts the UEFI device driver for execution. The executed UEFI device driver manages the update of the component firmware of the target hardware component. For example, the UEFI device driver can obtain information of a current component firmware of the target hardware component, obtain information about a candidate firmware image, and perform an update of the component firmware using the candidate firmware image.

In some cases, an existing UEFI device driver for a given hardware component may already be present in a system. If a capsule is received that includes a UEFI device driver for managing the update of the component firmware of the given hardware component, then there may be uncertainty relating to which UEFI device driver to use (the UEFI device driver in the capsule or the existing UEFI driver).

In some cases, system vendors of computing systems can define static proprietary processes for handling potential conflicts between UEFI device drivers in capsules and existing UEFI device drivers already running in a computing system. However, such approaches lack flexibility, and may result in sub-optimal and sometimes inconsistent performance relating to firmware updates in computing systems.

In accordance with some implementations of the present disclosure, as shown in FIG. 1, a dynamic configurable policy 102 is employed to determine how potential conflicts between device drivers in update images and existing device drivers are managed. The dynamic configurable policy 102 can be dynamically changed by a user of a computing system or an administrator of an information technology (IT) infrastructure that includes many computing systems. Examples of IT infrastructures include any or some combination of the following: a data center, a cloud environment, a storage network, a communications network, and so forth.

The dynamic configurable policy 102 can be pre-stored in a secure storage location to prevent an attacker from compromising the dynamic configurable policy 102. A "pre-stored" dynamical configurable policy 102 refers to a dynamical configurable policy that is stored in a storage location before a firmware update operation (such as that of a component firmware) is to occur. A policy that is received as part of an update image (such as a UEFI capsule) or with the update image is not considered to be a "pre-stored" policy. Corrupted policies may allow an attacker to cause installation of compromised device drivers in computing systems, which can result in security holes or errors.

As shown in FIG. 1, the dynamically configurable policy 102 is stored in a storage medium 104. The storage medium 104 can be implemented using a storage device or multiple storage devices. A "storage device" can refer to a memory device, a disk-based storage device, a solid-state storage device, and so forth. In some examples, the storage medium 104 is a persistent storage medium that maintains data stored in the storage medium 104 (without losing such data) even when power is removed from the storage medium 104 or a computing system 100 in which the storage medium 104 is included.

The computing system 100 can include any of a variety of different types of computing systems. Examples of a computing system include any or some combination of the following: a desktop computer, a laptop computer, a tablet computer, a server computer, a smart phone, a game appliance, a communication node (e.g., a router, a switch, etc.), an appliance (e.g., a household appliance, a television, etc.), an internet-of-things (IoT) device, a vehicle or a controller in a vehicle, and so forth.

FIG. 1 shows the storage medium 104 storing various different types of programs (including firmware, software, or more generally, machine-readable instructions). Note that the storage medium 104 may represent different types of storage media to store respective different types of programs, in some examples.

The storage medium 104 stores an operating system (OS) 106 and system firmware 108. The OS 106 when executed by a main processor 118 of the computing system 100 can manage various runtime services of the computing system 100, such as a file system to store data in files, a service to manage access of hardware components 112 by programs, security services, and so forth.

A processor can include a microprocessor, a core of a multi-core microprocessor, a microcontroller, a programmable integrated circuit, a programmable gate array, a digital signal processor, or another hardware processing circuit. Note that the "main processor" 118 can include one processor or multiple processors. The main processor 118 is distinct and separate from other processors that may be present in the system, including a management controller and so forth.

Examples of the hardware components 112 can include any or some combination of the following: a network interface controller, a graphics controller, a memory controller, a storage controller, a management controller, a processor, or any other type of hardware component.

The system firmware 108 (or a portion of the system firmware 108) is also executable by the main processor 118 to perform various services prior to loading of the OS 106 in the computing system 100. An execution environment in the computing system 100 prior to loading and execution of the OS 106 is referred to as a pre-OS environment. Examples of services performed by the system firmware 108 when executed on the main processor 118 in the pre-OS environment include any or some combination of the following: initializing the computing system 100 including initializing the hardware components 112, loading programs such as the OS 106, and so forth. For example, boot code 116 in the system firmware 108 can be loaded onto the main processor 118 for execution to perform boot phases that include the foregoing services and any other boot services. The system firmware 108 can also perform other services in the pre-OS environment. In addition, the system firmware 108 can perform services after the loading of the OS 106.

The storage medium 104 can also store various application programs. An example of an application program is a firmware update utility 110 that runs in the pre-OS environment to manage the update of component firmware 114 of respective hardware components 112. For example, the firmware update utility 110 can receive requests to update firmware in the computing system 100, and in response to such requests, can cause invocation of a procedure to update the target firmware.

The component firmware 114 for each hardware component 112 can be stored in the storage medium 104, and can be loaded onto the respective hardware component 112 during initialization of the computing system 100 to allow execution of the respective component firmware on the hardware component 112.

In the pre-OS environment, the computing system 100 may receive an update image 120 that is used for updating a component firmware (referred to as a "target component firmware"), such as any of the component firmware 114. In some examples, the update image 120 can be in the form of a UEFI capsule. In other examples, the update image 120 can be of a different form. Although FIG. 1 shows just one update image 120, it is noted that the computing system 100 may receive multiple update images 120 in other examples.

In some examples, the update image 120 includes a device driver 122 in addition to a firmware image 123 used for updating the target component firmware 114. In examples where the update image 120 is in the form of a UEFI capsule, the UEFI capsule includes a capsule header and a capsule body. The capsule body contains a device driver (or multiple device drivers) and a payload (or multiple payloads) that contain respective firmware image(s). The capsule header can include header information, including for example, a number of device drivers (if any) in the UEFI capsule; a number of payloads containing firmware images (if any) in the UEFI capsule; locations (in the form of offsets) of the device driver(s) (if any) and the payload(s) containing firmware image(s) (if any) in the UEFI capsule; information identifying which hardware component(s) to target for the component firmware update; and so forth.

In some cases, existing device drivers (e.g., UEFI device drivers) 124 for managing updates of the component firmware 114 for all or some of the hardware components 112 may already be present in the computing system 100. The existing device drivers 124 are stored in the storage medium 104. When a given existing device driver 124 is present for a respective given hardware component 112, the given existing device driver 124 is loaded (such as by the system firmware 108 or by the firmware update utility 110) from the storage medium 104 and executed by the main processor 118 in response to receiving an update image (e.g., the update image 120) for the given hardware component 112.

If the update image 120 includes a device driver (e.g., 122) for the given hardware component 112 (which means that there are multiple device drivers for managing the update of the component firmware 114 of the hardware component 112), then the system firmware 108 can access the dynamically configurable policy 102 to determine an action to take to resolve the fact that there is both the device driver 122 in the update image 120 and an existing device driver 124 for the given hardware component 112.

In the example of FIG. 1, the dynamically configurable policy 102 is stored in a secure location in the storage medium 104, such as part of the system firmware 108. Although FIG. 1 shows the dynamically configurable policy 102 is being included within the system firmware 108, the dynamically configurable policy 102 can in some examples be separate from the system firmware 108. For example, the dynamically configurable policy 102 can be part of metadata associated with the system firmware 108. The dynamically configurable policy 102 that is associated with the system firmware 108 is secured by a security mechanism used for the system firmware 108, such as any cryptographic-based security mechanism. In this matter, an attacker would find it difficult to hack the dynamically configurable policy 102.

In other examples, the dynamically configurable policy 102 can be stored in a separate storage location in the storage medium 104, such as being part of the firmware update utility 110 or in a configuration file or other metadata associated with the firmware update utility 110. The firmware update utility 110 can also be protected using a security mechanism that would make it difficult for a hacker to modify the dynamically configurable policy 102.

The dynamically configurable policy 102 can specify, for each respective hardware component 112, any of the following example actions to take when there is both a device driver in an update image and an existing device driver for a target hardware component 112.

A first action (action A) that can be specified by the dynamically configurable policy 102 is that the device driver 122 in the update image 120 is to be used, and the existing device driver 124 for the target hardware component 112 is to be disconnected by the system firmware 108. The device driver 122 in the update image 120 is selected to use for managing firmware update services of the component firmware 114 for the target hardware component 112. Disconnecting a device driver can refer to disabling or otherwise preventing the device driver from execution in the computing system 100. In some cases, disconnecting the device driver can include removing or deleting the device driver. In other cases, the device driver that is disconnected is not removed, but rather is maintained in a disabled or inactive state.

A second action (action B) that can be specified by the dynamically configurable policy 102 is that the existing device driver 124 for the target hardware component 112 is to be used, and to ignore the device driver 122 in the update image 120. In other words, the device driver 122 in the update image 120 is not loaded into the computing system 100, such that the existing device driver 124 for the target hardware component 112 is allowed to run to manage firmware update services of the component firmware 114 for the target hardware component 112.

A third action (action C) that can be specified by the dynamically configurable policy 102 is to use a newer version of the existing device driver 124 for the target hardware component 112 and the device driver 122 in the update image 120. In some examples, a device driver can be associated with driver version information to indicate a version of the device driver.

For example, the driver version information can be indicated by the following field defined by the UEFI Specification: EFI_DRIVER_BINDING_PROTOCOL. For example, the foregoing parameter can be published by a device driver at an entry point of the device driver, where the "entry point" of the device driver refers to an initial portion of the device driver that is executed when the device driver is invoked. The system firmware 108 can compare the driver version of the existing device driver 124 for the target hardware component 112 and the driver version of the device driver 122 of the update image 120. The comparison can allow for a determination of which of the device drivers for the target hardware component 112 is newer, and the system firmware 108 can select the newer version device driver (122 or 124) to be used for managing update services for the component firmware 114 of the target hardware component 112.

Thus, if the existing device driver 124 for the target hardware component 112 is the newer version, then the existing device driver 124 for the target hardware component 112 is selected, and the device driver 122 in the update image 120 is not loaded. On the other hand, if the device driver 122 in the update image 120 is the newer version, then the existing device driver 124 for the target hardware component 112 is disconnected, and the device driver 122 in the update image 120 is loaded for execution.

In some examples, the dynamically configurable policy 102 is a systemwide policy (applicable for the computing system 100 or an IT infrastructure that includes multiple computing systems) that can be applied consistently for multiple update images for respective different hardware components. The dynamically configurable policy 102 can include the same policy for different hardware components 112, or different policies for respective different hardware components 112 (or different categories of hardware components 112).

Additionally, the dynamically configurable policy 102 can be dynamically changed, such as by a user using a user interface (UI) 130. In some examples, the UI 130 can be presented, by the system firmware 108 in the pre-OS environment, for display by a display device (not shown). In other examples, the UI 130 can be presented by a different program of the computing system 100. A program "presenting" the UI 130 can refer to the program causing display of the UI 130 by the computing system 100, or the program causing a transmission of information relating to the UI 130 to a remote system for display at the remote system.

The UI 130 includes a policy change interface 132 that allows a user to make a change to the dynamically configurable policy 102. For example, if the UI 130 is a graphical user interface (GUI), then the policy change interface 132 can include a GUI screen having control elements that can be used by a user to make changes to the dynamically configurable policy 102.

Figure 2:
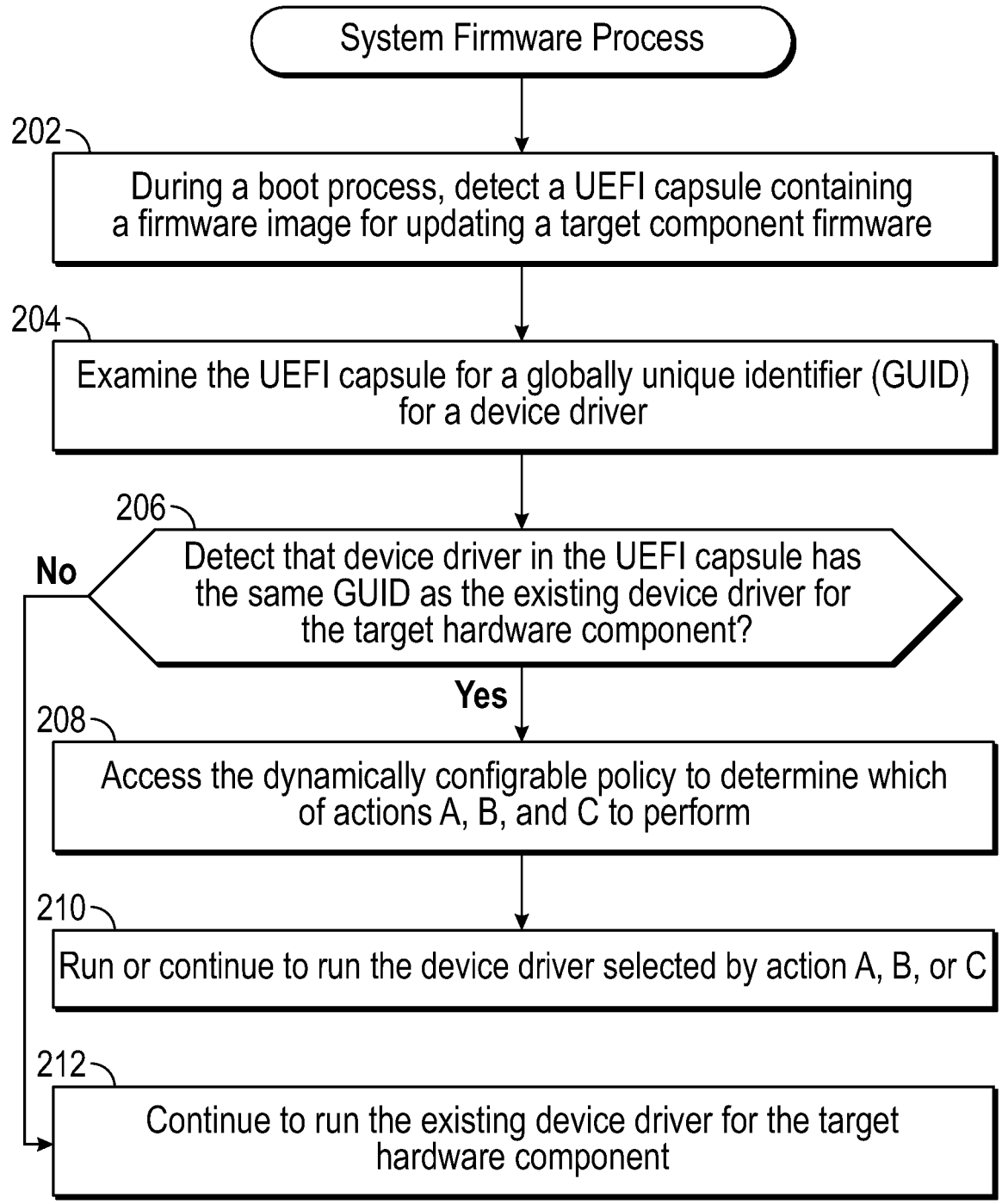
FIG. 2 is a flow diagram of a process of a system firmware according to some examples.

FIG. 2 is a flow diagram of a process that can be performed by the system firmware 108 in accordance with some implementations of the present disclosure. Note that FIG. 2 assumes an example in which UEFI mechanisms are employed. In other examples, non-UEFI techniques may be employed.

During a boot process of the computing system 100, the system firmware 108 detects (at 202) a UEFI capsule containing a firmware image for updating a target component firmware 114, either using mechanisms described in the UEFI Specification or otherwise.

The system firmware 108 examines (at 204) the UEFI capsule for a globally unique identifier (GUID) for a device driver, such as an EFI_FIRMWARE_MANAGEMENT_CAPSULE_ID_GUID. This GUID indicates that the capsule body of the UEFI capsule contains a device driver with updated firmware update services.

The UEFI Specification describes how the system firmware 108 can locate instances of firmware update services, referred to as Firmware Management Protocols (FMPs), in a computing system. FMP is the term used by the UEFI Specification to refer to firmware update services of a device driver (122 or 124 in FIG. 1). For each detected respective FMP (associated with a device driver 122 in the UEFI capsule as well as with each existing device driver 124), the system firmware 108 can call the UEFI GetImageInfo function of the respective FMP. The GetImageInfo function returns a firmware image descriptor that includes a GUID to uniquely identify the firmware image type than is handled by the respective FMP.

If the UEFI capsule contains a device driver (122) for the target hardware component 112 and an existing device driver 124 for the target hardware component 112 is also present, then the system firmware 108 will detect (at 206) that the device driver in the UEFI capsule has the same GUID as the existing device driver 124 for the target hardware component 112, which indicates that the device driver 122 in the UEFI capsule is for the same image type as the existing device driver 124 for the target hardware component 112. More specifically, the UEFI GetImageInfo functions of the respective FMPs of the device driver 122 and the existing device driver 124 will return the same firmware image type GUID, which indicates the presence of multiple device drivers for the same target hardware component 112. The ImageTypeId (a GUID) of the existing device driver 124 for the target hardware component 112 matches the UpdateImageTypeId (a GUID) of the device driver 122 in the UEFI capsule.

If the system firmware 108 detects (at 206) multiple device drivers for the same target hardware component 112, then the system firmware 108 accesses (at 208) the dynamically configurable policy 102 to determine which of actions A, B, and C to perform, to select one of the multiple drivers to use.

Action A uses the device driver 122 of the UEFI capsule. The system firmware 108 loads the device driver 122 of the UEFI capsule, and disconnects the existing device driver 124 for the target hardware component 112. According to UEFI, disconnecting the existing device driver 124 can be accomplished by calling the following command, for example: EFI_BOOT_SERVICES->DisconnectController. The system firmware 106 then extracts the device driver 122 from the UEFI capsule, and loads the device driver 122, such as by calling the following sequence of commands: LoadImage( ) followed by StartImage( ).

Action B uses the existing device driver 124 for the target hardware component 112, and ignores the device driver 122 in the UEFI capsule.

Action C uses the newer device driver from among the device driver 122 in the UEFI capsule and the existing device driver 124 for the target hardware component 112. The driver version for each of the device driver 122 and the existing device driver 124 for the target hardware component 112 can be obtained by capturing the associated device driver information, such as the EFI_DRIVER_BINDING_PROTOCOL. Version associated with each device driver. The system firmware 108 compares the driver version of the device driver 122 in the UEFI capsule with the driver version of the existing device driver 124 for the target hardware component 112.

1. If the UEFI capsule device driver 122 version is newer, the system controller 106 disconnects the existing device driver 124 for the target hardware component 112, such as by calling EFI_BOOT_SERVICES->DisconnectController.
2. If the version of the existing device driver 124 for the target hardware component 112 is newer, the system controller 106 ignores the device driver 122 in the UEFI capsule.

The system firmware 106 then runs or continues to run (at 210) the device driver selected by action A, B, or C.

If the system firmware 108 detects (at 206) that there is just the existing device driver 124 for the same target hardware component 112, then the system firmware 108 continues to run (at 212) the existing device driver 124 for the same target hardware component 112, where the existing device driver 124 may already be running.

Figure 3:
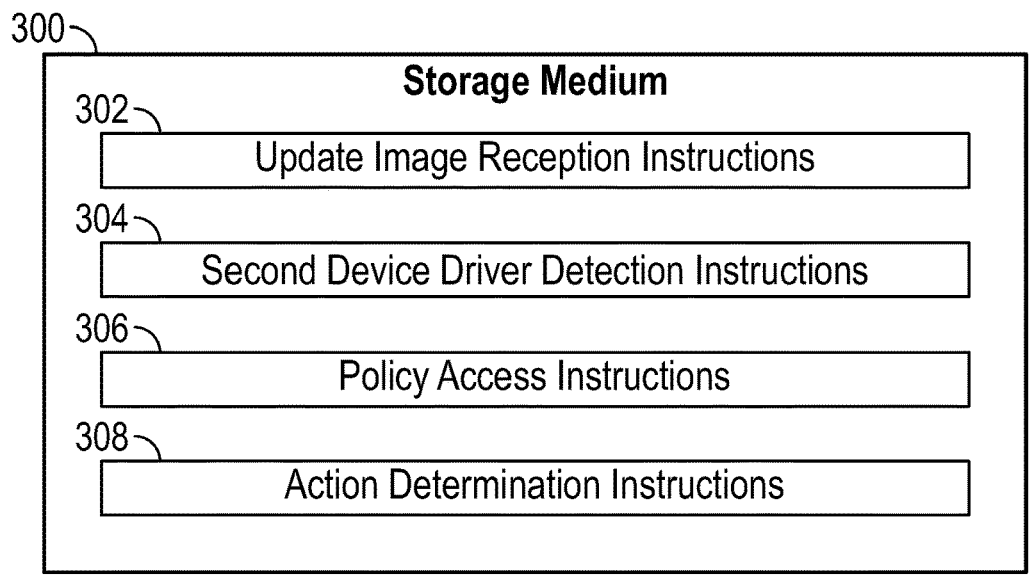
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks.

The machine-readable instructions include update image reception instructions 302 to receive an update image including a first device driver to execute in a pre-OS environment of the system.

The machine-readable instructions include second device driver detection instructions 304 to detect a second device driver that is already in the system. Each of the first device driver and the second device driver is to manage an update of a program code (e.g., a component firmware 114) in the pre-OS environment.

The machine-readable instructions include policy access instructions 306 to access a pre-stored dynamically configurable policy in the system, where the pre-stored dynamically configurable policy relates to updates of device drivers in the pre-OS environment relating to selection from among device drivers in the pre-OS environment. In some examples, the pre-stored dynamically configurable policy is stored with firmware (e.g., the system firmware 108 of FIG. 1) in the system. In other examples, the pre-stored dynamically configurable policy is stored with a firmware update utility (e.g., 110 in FIG. 1) in the system, where the firmware update utility is for triggering updating of a firmware of the system.

The pre-stored dynamically configurable policy is stored in a storage medium of the system before receipt of the update image, or before receipt of any update image for updating component firmware of hardware components. The pre-stored dynamically configurable policy is applicable to updates of component firmware for multiple hardware components responsive to respective update images.

The machine-readable instructions include action determination instructions 308 to determine, based on the pre-stored dynamically configurable policy, an action (e.g., action A, B, or C discussed further above) to take in response to the update image.

If the pre-stored dynamically configurable policy specifies that device drivers in update images are to replace existing device drivers, then the action determined based on the pre-stored dynamically configurable policy includes disconnecting the second device driver in the system, and installing the first device driver in the system.

If the pre-stored dynamically configurable policy specifies that device drivers in update images are to be ignored if existing device drivers are present, then the action determined based on the pre-stored dynamically configurable policy includes keeping the second device driver in the system and not installing the first device driver in the system.

If the pre-stored dynamically configurable policy specifies that newer device drivers from among device drivers in update images and existing device drivers are to be used, then the action determined based on the pre-stored dynamically configurable policy includes one of: determining which of the first device driver and the second device driver is a newer version, disconnecting, in the system, an older version of the first device driver and the second device driver, and installing, in the system, the newer version of the first device driver and the second device driver.

Figure 4:
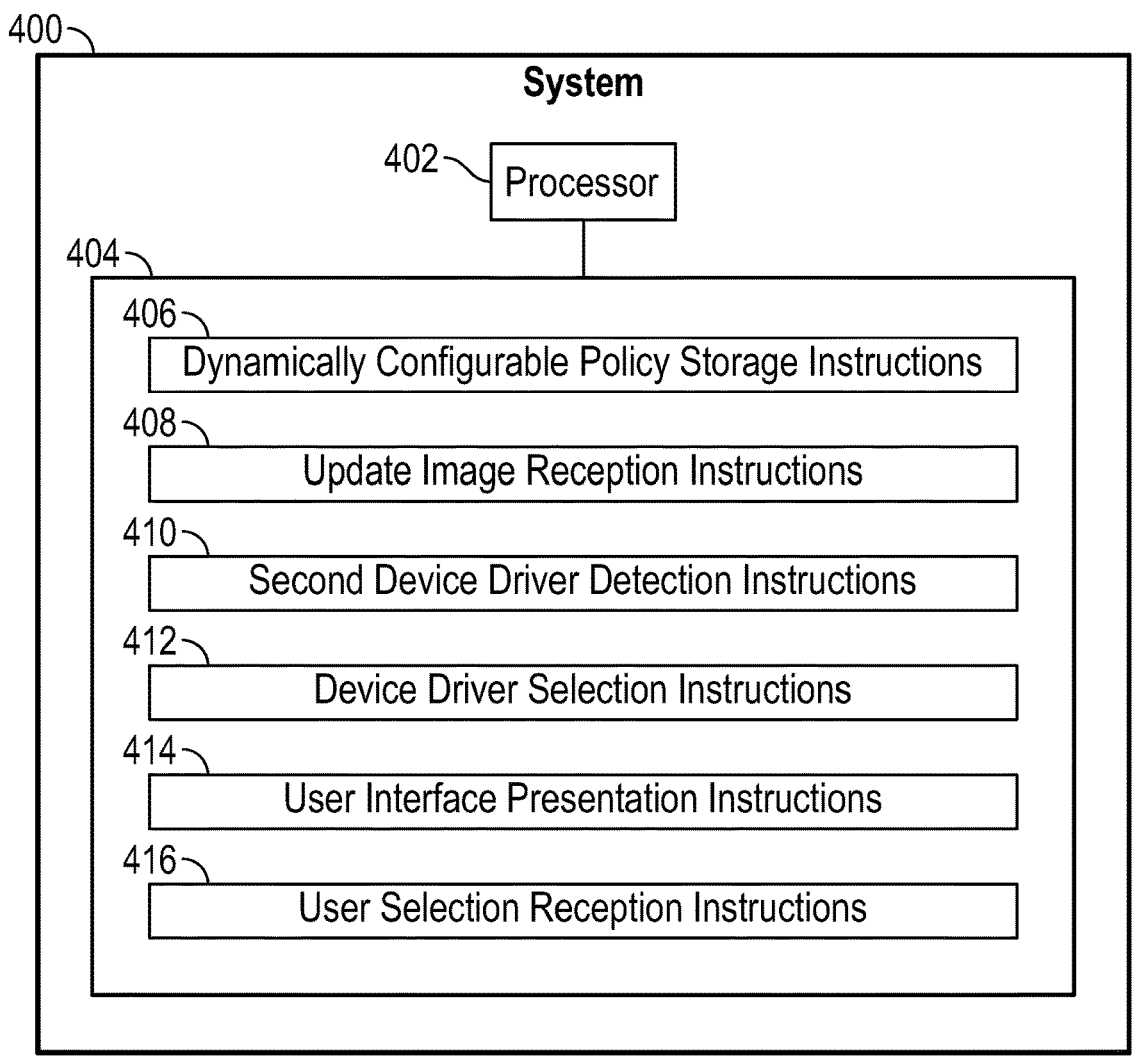
FIG. 4 is a block diagram of the system according to some examples.

FIG. 4 is a block diagram of a system 400 according to some examples. The system 400 can be implemented as a single computer or multiple computers.

The system 400 includes a hardware processor 402 (or multiple hardware processors).

The system 400 further includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include dynamically configurable policy storage instructions 406 to store, prior to receiving update images for updating component firmware of hardware components, a dynamically configurable policy relating to selection from among device drivers a pre-OS environment of the system.

The machine-readable instructions include update image reception instructions 408 to receive an update image comprising a first device driver to execute in the pre-OS environment.

The machine-readable instructions include second device driver detection instructions 410 to detect a second device driver that is already in the system. Each of the first device driver and the second device driver can be used to manage an update of a component firmware of a first hardware component.

The machine-readable instructions include device driver selection instructions 412 to, in response to the detecting, determine, based on the dynamically configurable policy, which of the first device driver and the second device driver to select for use in updating the component firmware of the first hardware component.

The machine-readable instructions include user interface presentation instructions 414 to present a user interface relating to the dynamically configurable policy.

The machine-readable instructions include user selection reception instructions 416 to receive a user selection in the user interface to modify the dynamically configurable policy.

Figure 5:
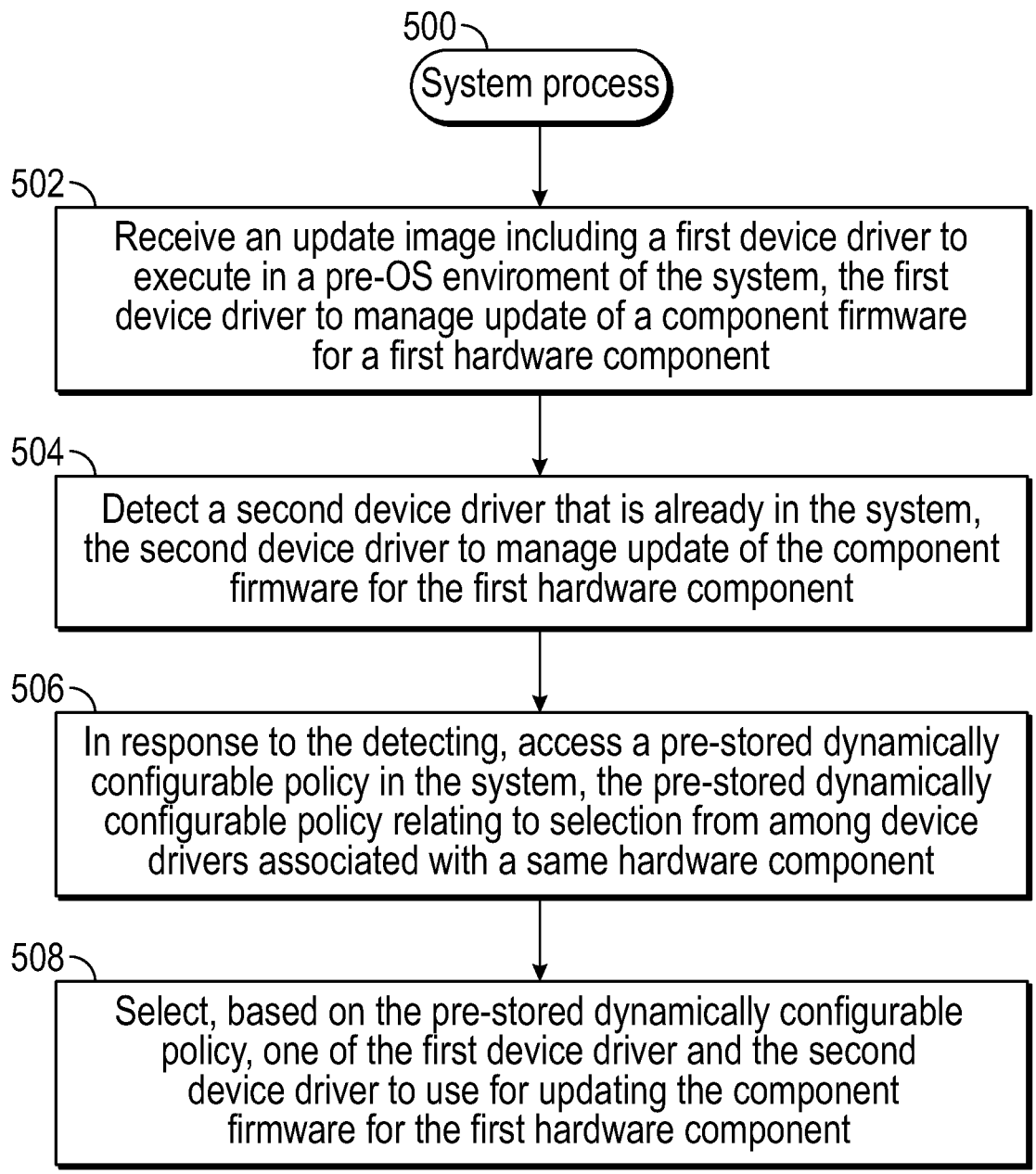
FIG. 5 is a flow diagram of a process according to some examples.

FIG. 5 is a flow diagram of a process 500 according to some examples. The process 500 includes receiving (at 502) an update image including a first device driver to execute in a pre-OS environment of the system, the first device driver to manage update of a component firmware for a first hardware component.

The process 500 includes detecting (at 504) a second device driver that is already in the system, the second device driver to manage update of the component firmware for the first hardware component.

The process 500 includes, in response to the detecting, accessing (at 506) a pre-stored dynamically configurable policy in the system, the pre-stored dynamically configurable policy relating to selection from among device drivers associated with a same hardware component.

The process 500 includes selecting (at 508), based on the pre-stored dynamically configurable policy, one of the first device driver and the second device driver to use for updating the component firmware for the first hardware component.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive an update image comprising a first device driver to execute in a pre-operating system (pre-OS) environment of the system;
   detect a second device driver that is already in the system;
   access a pre-stored dynamically configurable policy in the system, the pre-stored dynamically configurable policy relating to selection from among device drivers in the pre-OS environment; and
   determine, based on the pre-stored dynamically configurable policy, an action to take in response to the update image.

2. The non-transitory machine-readable storage medium of claim 1, wherein the instructions upon execution cause the system to:
   present a user interface relating to the pre-stored dynamically configurable policy; and
   receive, through the user interface, a user selection of a change of the pre-stored dynamically configurable policy.

3. The non-transitory machine-readable storage medium of claim 1, wherein the pre-stored dynamically configurable policy is stored with firmware in the system, the firmware to load an OS in the system to establish an OS environment following tasks of the firmware are completed.

4. The non-transitory machine-readable storage medium of claim 1, wherein the pre-stored dynamically configurable policy is stored with a firmware update utility in the system, the firmware update utility for triggering updating of a firmware of the system.

5. The non-transitory machine-readable storage medium of claim 1, wherein each of the first device driver and the second device driver is to manage an update of a program code in the pre-OS environment.

6. The non-transitory machine-readable storage medium of claim 5, wherein the program code to be updated in the pre-OS environment comprises a firmware.

7. The non-transitory machine-readable storage medium of claim 6, wherein the firmware comprises a component firmware for execution on a hardware component, and each of the first device driver and the second device driver is to manage an update of the component firmware of the hardware component.

8. The non-transitory machine-readable storage medium of claim 1, wherein the pre-stored dynamically configurable policy specifies that device drivers in update images are to replace existing device drivers, and the action determined based on the pre-stored dynamically configurable policy comprises disconnecting the second device driver in the system, and installing the first device driver in the system.

9. The non-transitory machine-readable storage medium of claim 8, wherein the instructions upon execution cause the system to run the first device driver in the pre-OS environment of the system after the installing of the first device driver.

10. The non-transitory machine-readable storage medium of claim 1, wherein the pre-stored dynamically configurable policy specifies that device drivers in update images are to be ignored if existing device drivers are present, and the action determined based on the pre-stored dynamically configurable policy comprises keeping the second device driver in the system and not installing the first device driver in the system.

11. The non-transitory machine-readable storage medium of claim 10, wherein the instructions upon execution cause the system to run the second device driver in the pre-OS environment of the system after determining to not install the first device driver based on the pre-stored dynamically configurable policy.

12. The non-transitory machine-readable storage medium of claim 1, wherein the pre-stored dynamically configurable policy specifies that newer device drivers from among device drivers in update images and existing device drivers are to be used, and the action determined based on the pre-stored dynamically configurable policy comprises:
   determining which of the first device driver and the second device driver is a newer version, and
   use the newer version of the first device driver and the second device driver.

13. The non-transitory machine-readable storage medium of claim 12, wherein the instructions upon execution cause the system to run the newer version of the first device driver and the second device driver in the pre-OS environment of the system after the installing of the first device driver and the second device driver.

14. The non-transitory machine-readable storage medium of claim 1, wherein the update image comprises a Unified Extensible Firmware Interface (UEFI) capsule, and wherein the first device driver and the second device driver comprise UEFI device drivers.

15. The non-transitory machine-readable storage medium of claim 1, wherein the pre-stored dynamically configurable policy is stored in a storage medium of the system before receipt of the update image.

16. The non-transitory machine-readable storage medium of claim 1, wherein the pre-stored dynamically configurable policy is applicable to updates of component firmware for multiple hardware components responsive to respective update images.

17. A system comprising:
a processor; and
a non-transitory storage medium comprising instructions executable on the processor to:
   store, prior to receiving update images for updating component firmware of hardware components, a dynamically configurable policy relating to selection from among device drivers a pre-operating system (pre-OS) environment of the system;
   receive an update image comprising a first device driver to execute in the pre-OS environment;
   detect a second device driver that is already in the system, each of the first device driver and the second device driver to manage an update of a component firmware of a first hardware component of the hardware components;
   in response to the detecting, determine, based on the dynamically configurable policy, which of the first device driver and the second device driver to select for use in updating the component firmware of the first hardware component;
   present a user interface relating to the dynamically configurable policy; and
   receive a user selection in the user interface to modify the dynamically configurable policy.

18. The system of claim 17, wherein the instructions comprise a system firmware, and the dynamically configurable policy is stored with the system firmware.

19. A method of a system comprising a hardware processor, comprising:
   receiving an update image comprising a first device driver to execute in a pre-operating system (pre-OS) environment of the system, the first device driver to manage update of a component firmware for a first hardware component;
   detecting a second device driver that is already in the system, the second device driver to manage update of the component firmware for the first hardware component;
   in response to the detecting, accessing a pre-stored dynamically configurable policy in the system, the pre-stored dynamically configurable policy relating to selection from among device drivers associated with a same hardware component; and
   selecting, based on the pre-stored dynamically configurable policy, one of the first device driver and the second device driver to use for updating the component firmware for the first hardware component.

20. The method of claim 19, further comprising:
   presenting a user interface relating to the pre-stored dynamically configurable policy; and
   receiving, through the user interface, a user selection of a change of the pre-stored dynamically configurable policy.

* * * * *